Dec. 17, 1935.  W. F. JOHNSON  2,024,451
GRID BAR FOR COTTON OPENERS
Filed Dec. 8, 1933
Fig. 1.
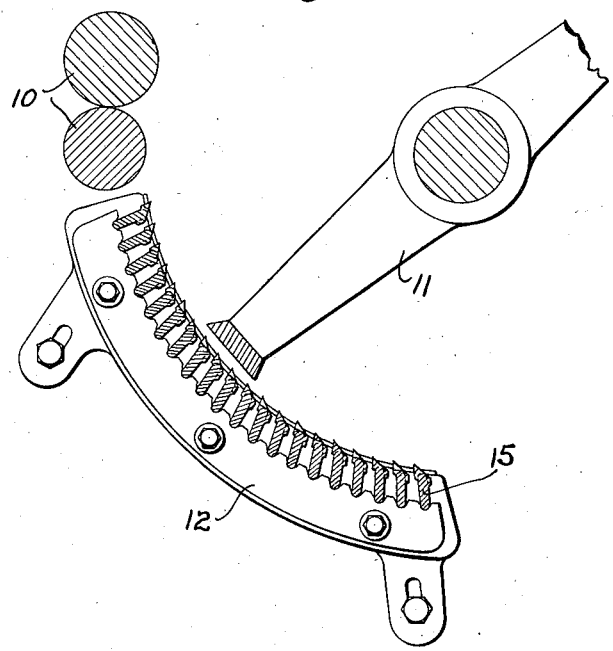
Fig. 3.
Fig. 2.
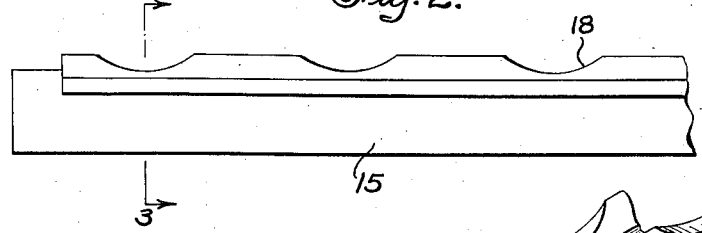
Fig. 4.
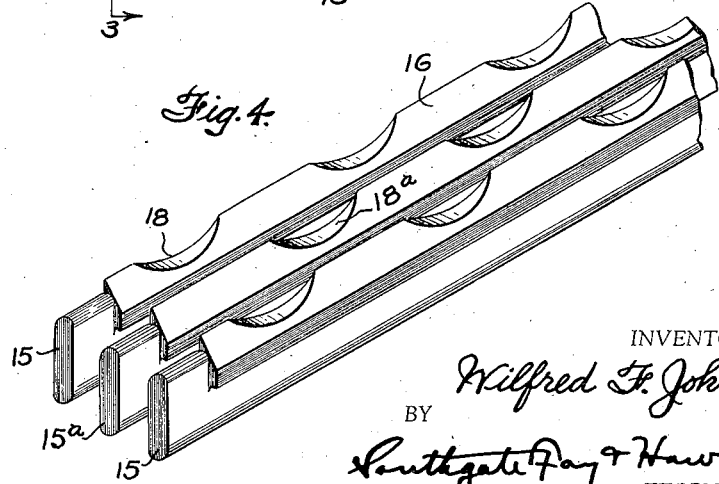
INVENTOR.
Wilfred F. Johnson.
BY
Southgate Fay & Hawley
ATTORNEYS.

Patented Dec. 17, 1935

2,024,451

UNITED STATES PATENT OFFICE 2,024,451

GRID BAR FOR COTTON OPENERS

Wilfred F. Johnson, Charlotte, N. C., assignor to Whitin Machine Works, Whitinsville, Mass., a corporation of Massachusetts Application December 8, 1933, Serial No. 701,486

3 Claims. (Cl. 19—95)

This invention relates to cotton beaters, openers and cleaners, and more particularly to the stationary grid bars coacting with the rotating beaters. Such machines are designed to separate waste material such as leaves, seeds and dirt from the cotton, the separated material passing out through the spaces between adjacent grid bars.

It is the object of my invention to improve the construction of such grid bars, to the intent that the cleaning operation may be more effectively performed thereby.

More specifically, I provide grid bars coacting to present an improved agitating surface to the cotton passing thereover.

In the preferred embodiment of my invention, I provide grid bars with spaced recesses in the operative edge portions thereof, and I preferably arrange the bars in series, with the recesses in successive adjacent bars in staggered relation.

My invention further relates to arrangements and combinations of parts which will be hereinafter described and more particularly pointed out in the appended claims.

A preferred form of the invention is shown in the drawing, in which

Fig. 1 is a sectional end elevation of parts of a cotton opener or cleaner;

Fig. 2 is a partial side elevation of one of my improved grid bars;

Fig. 3 is a sectional elevation thereof, taken along the line 3—3 in Fig. 2, and Fig. 4 is a partial perspective view of a series of grid bars in assembled relation.

Referring to the drawing, I have shown parts of a cotton opener or cleaner including feed rolls 10, a rotatable beater 11 and a support 12 for a series of grid bars 15. These bars are mounted in spaced relation in the support 12 and are securely held in fixed position during the operation of the machine.

Each grid bar is preferably provided with a beveled upper edge portion 16, which edge portion is preferably of increased width or thickness.

In the carrying out of my invention, I provide grid bars 15 each having a series of spaced recesses 18 in its upper edge. These recesses are preferably of segmental shape and may be conveniently formed by a milling operation. I also provide additional grid bars 15a in which similar recesses 18a are formed. The spacing between the recesses 18 and 18a is preferably identical and uniform, but the recesses are differently located with respect to the ends of the bars, and are so positioned that the recesses 18a are staggered with respect to the recesses 18 when the grid bars 15 and 15a are arranged in alternate series as shown in Fig. 4.

By thus providing a series of grid bars with a plurality of staggered upper edge recesses, an improved agitating surface is presented to the cotton driven past the grid bars by the beater 11. The cotton is much more effectively agitated by my improved bars and the waste material in the cotton is more effectively separated therefrom.

By providing recesses of segmental shape, I avoid corners or angles in the recesses in which cotton or waste material might accumulate. It is obvious, however, that the advantages of my invention may be attained to a considerable extent by the provision of non-segmental recesses.

Having thus described my invention and the advantages thereof, I do not wish to be limited to the details herein disclosed, otherwise than as set forth in the claims, but what I claim is:—

1. In a cotton cleaning machine, a beater and a grid bar having the portion thereof most closely adjacent the path of the beater formed with a narrow straight edge and with all parts of said bar adjacent said narrow straight edge abruptly diverging from the path of said beater, and said straight edge having recesses therein substantially spaced apart longitudinally and said recesses being separated by straight sections of said edge of substantial length.

2. In a cotton cleaning machine, a beater and a grid bar having the portion thereof most closely adjacent the path of the beater formed with a narrow straight edge and with all parts of said bar adjacent said narrow straight edge abruptly diverging from the path of said beater, and said straight edge having segmental recesses therein substantially spaced apart longitudinally and said recesses being separated by straight sections of said edge at least as long as said recesses.

3. In a cotton cleaning machine, a beater and a grid bar having the portion thereof most closely adjacent the path of the beater formed with a narrow straight edge and with all parts of said bar adjacent said narrow straight edge abruptly diverging from the path of said beater, and said straight edge having recesses therein substantially spaced apart longitudinally and said recesses being separated by straight sections of said edge of substantial length, the recesses in adjacent bars being differently spaced from the ends of said bars and being thereby staggered with respect to each other when said bars are in assembled relation in said machine.

WILFRED F. JOHNSON.